United States Patent [19]

Patrick

[11] Patent Number: 5,362,198
[45] Date of Patent: Nov. 8, 1994

[54] BULK MATERIALS TRANSPORTATION SYSTEM

[75] Inventor: Kenneth J. Patrick, Medfield, Mass.

[73] Assignee: Intermodal Technologies, Inc., Nashua, N.H.

[21] Appl. No.: 132,536

[22] Filed: Oct. 6, 1993

Related U.S. Application Data

[60] Continuation-in-part of Ser. No. 757,473, Sep. 10, 1991, Pat. No. 5,256,023, which is a division of Ser. No. 440,314, Nov. 22, 1989, Pat. No. 5,078,560.

[51] Int. Cl.⁵ .............................................. B65G 67/00
[52] U.S. Cl. ................................. 414/786; 414/411; 414/414; 414/642; 206/596
[58] Field of Search ............... 414/403, 404, 406, 408, 414/411, 419, 420, 421, 424, 425, 414, 621, 622, 607, 608, 632, 634, 635, 642, 685, 697, 704, 724, 912, 786, 743; 410/68; 206/596; 220/1.5, 260, 284, 285

[56] References Cited

U.S. PATENT DOCUMENTS

| | | | |
|---|---|---|---|
| 1,807,268 | 5/1931 | Woodruff | 410/54 |
| 2,706,623 | 4/1955 | Styes | 414/912 X |
| 2,768,761 | 10/1956 | Vandemark et al. | 414/622 |
| 3,086,669 | 4/1963 | Rogers et al. | |
| 3,130,846 | 4/1964 | Wender | 414/408 |
| 3,167,195 | 1/1965 | Jensen et al. | 414/408 |
| 3,305,118 | 2/1967 | Lull | 414/718 |
| 3,327,879 | 6/1967 | Lull | 414/718 |
| 3,477,601 | 11/1969 | Gardner et al. | 414/622 X |
| 3,552,325 | 1/1971 | Enochian | 410/54 |
| 3,561,621 | 2/1971 | Rivers, Jr. | 414/347 |
| 3,623,631 | 11/1971 | Ford | 206/596 |
| 3,643,993 | 2/1972 | Asadurian | 414/408 |
| 3,805,709 | 4/1974 | Schuller et al. | 410/54 |
| 3,937,339 | 2/1976 | Geis et al. | 414/697 |
| 3,968,895 | 7/1976 | Barnes, Jr. et al. | 204/596 |
| 4,036,383 | 7/1977 | Allen | 414/420 |
| 4,219,300 | 8/1980 | McMillan | 414/420 |
| 4,272,217 | 6/1981 | Sefcik | 414/718 |
| 4,354,781 | 10/1982 | Roberts | 410/68 |
| 4,378,188 | 3/1983 | Hardwick | 414/411 |
| 4,395,188 | 7/1983 | Kaup | 414/622 |
| 4,422,814 | 12/1983 | Borders | 414/420 |
| 4,423,997 | 1/1984 | Pemberton | 414/622 X |
| 4,547,118 | 10/1985 | Pittenger | 414/685 |
| 4,552,500 | 11/1985 | Ghibaudo et al. | 414/408 |
| 4,699,557 | 10/1987 | Barnes | 414/408 |
| 4,715,767 | 12/1987 | Edelhoff et al. | 414/408 |
| 4,756,425 | 7/1988 | Wise | 206/596 |
| 4,806,061 | 2/1989 | Fenton | 414/529 |
| 4,825,778 | 5/1989 | Riley | 410/54 |
| 4,826,474 | 5/1989 | Holmes | 414/697 |

FOREIGN PATENT DOCUMENTS

| | | | |
|---|---|---|---|
| 253021 | 6/1926 | United Kingdom | 410/68 |
| 1217727 | 3/1986 | U.S.S.R. | 414/420 |
| 1463560 | 3/1989 | U.S.S.R. | 414/480 |

OTHER PUBLICATIONS

Product Brochure, Cat 992C Wheel Loader, Caterpillar, Inc.
Product Brochure, Cat 988B Wheel Loader, Caterpillar, Inc.
Product Brochure, Cat IT28B Integrated Tool Carrier, Caterpillar, Inc.
Product Brochure, IT18 Integrated Tool Carrier, Caterpillar, Inc.

*Primary Examiner*—Michael S. Huppert
*Assistant Examiner*—James Eller
*Attorney, Agent, or Firm*—Peter J. Manus

[57] ABSTRACT

An intermodal transportation system for hauling bulk material, particularly municipal solid waste, by rail and truck utilizes multiple rectangular, open-top boxes each having a removable lid. Each box and associated lid include one or more channels that can be engaged simultaneously by a forklift that includes two fork groups wherein one fork group can be engaged in the channels of the box while a second fork group is engaged in the channels of the associated lid. In operation, the forklift can engage the lid and box simultaneously, remove the lid from the box and then dump or otherwise manipulate the box while the lid remains positioned on the forklift.

16 Claims, 8 Drawing Sheets

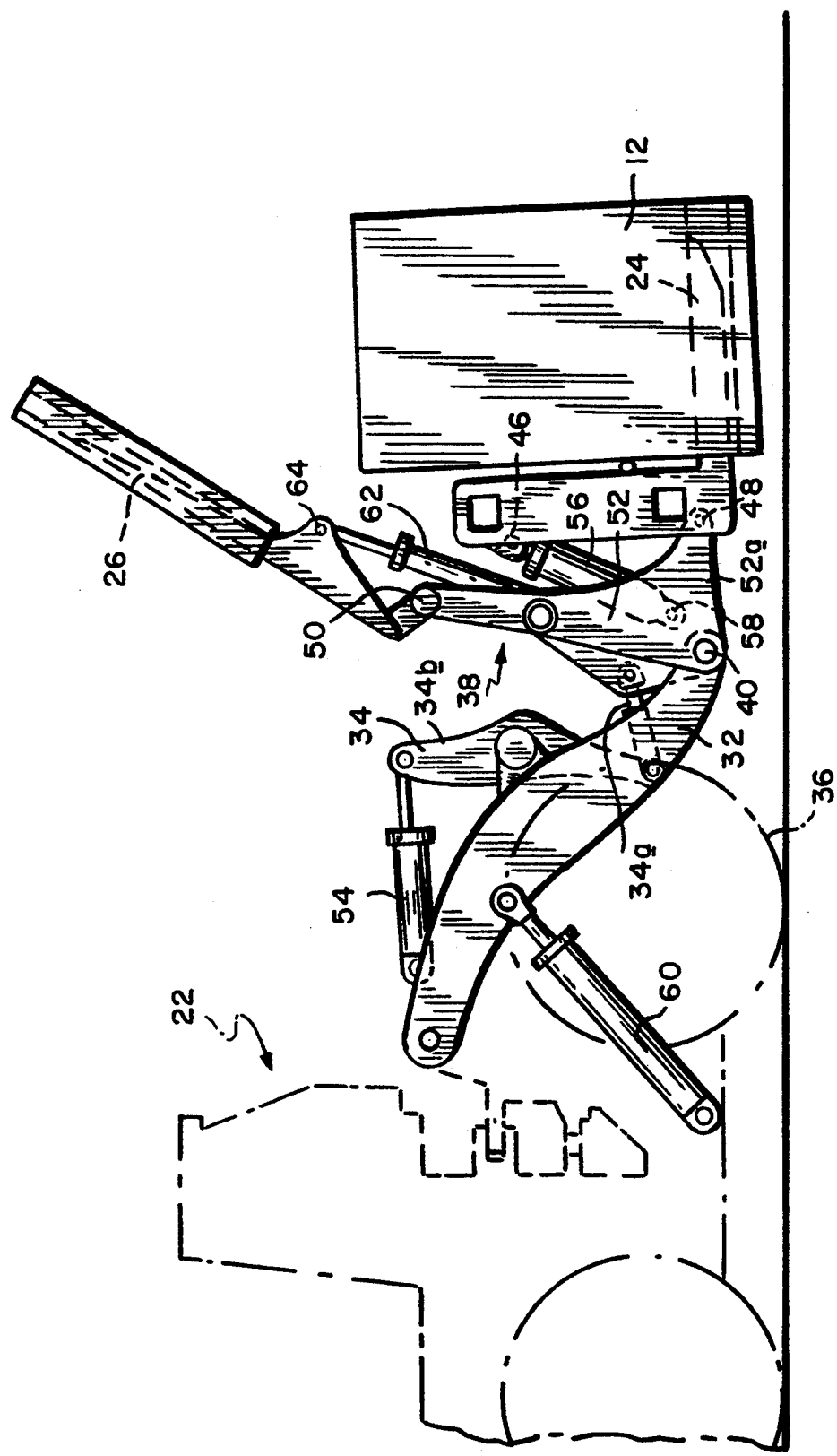

BULK MATERIALS TRANSPORTATION SYSTEM

CROSS-REFERENCE TO RELATED APPLICATIONS

This application is a continuation-in-part of application Ser. No. 07/757,473, filed on Sep. 10, 1991, now U.S. Pat. No. 5,256,023, which is a division of application Ser. No. 07/440,314, filed on Nov. 22, 1989, now U.S. Pat. No. 5,078,560.

BACKGROUND OF THE INVENTION

This invention relates in general to transportation systems and in particular to an intermodal railway system utilizing closed containers to carry bulk materials particularly municipal solid waste, by truck and rail.

The disposal of municipal solid waste (MSW) such as common garbage and trash as well as sludge produced by water treatment facilities is becoming an increasingly important and difficult problem as landfilled sites convenient to urban centers are becoming full and environmental protection concerns have foreclosed the ocean dumping of solid refuse. At present, the most common MSW disposal system is to simply haul the MSW by tractor (transfer) trailer from an urban collection point or treatment plant to a landfill. Given the capital cost of a "transfer trailer" and typical current operating costs per mile for a typical 22 ton load, currently there is approximately a 300 mile one way haul distance limit on economically feasible disposal sites.

Because the tonnage that can be hauled by truck in a single load is limited by highway and bridge laws, the cost of transporting bulk waste by truck is inherently limited as to its volume and weight. While railroads can carry larger loads, measured both in volume and in weight, over long distances, to date efforts to use railway cars for hauling low value bulk materials, particularly loose MSW, has proven to be financially uneconomical. At present there is substantially no use of railroads to haul municipal solid waste. Indeed, at present the maximum payload that is carried by any standard railway car is about 60 tons, regardless of the type of car or the nature of its load.

One known approach to utilizing railroads for bulk transportation is a convertible trailer which has detachable rail wheels and specialized interconnections so that the highway trailer can be converted into a railroad car. An example of this type of unit is a product sold by the Thrall Car Company under the trade designation "Roadrailer". While the system has found some market for hauling high value items, it is not economical for transportation of bulk materials. The detachable wheels and special interconnection systems to convert the "transfer trailer" into a "railroad car" significantly increases the capital cost of each unit required to transport a given weight, e.g., the 22 tons normally carried by a "transfer trailer" when hauling MSW. Also, the converted "cars" do not operate in conjunction with existing railroad service; they must operate as a complete train and there is currently in the U.S. a required minimum shipment level of 60 units. Further, charges for railway transport of a single "car" of this type carrying 22 tons is equivalent to that of a single railway car operating in a "piggy back" mode carrying approximately twice the payload.

Well known transportation systems utilizing railways also include the use of dedicated railway car such as box cars, gondolas, and hoppers. Such cars have a long standing history in transporting loose bulk materials such as coal, ores, ash, sludge, salt, and grain products. One major problem, however, is the loading and unloading of the bulk material from the car. If the cars are not open topped, loading through side doors is inherently difficult for a loose bulk material. If the car has an open top, loading may be simple, but unloading can still be a problem.

Certain loads can be removed with a clamshell scoop, but this process is slow and has significant capital costs. Another solution is movable openings or doors such as a "walking floor" or the conventional "push out" system. These techniques, while being perhaps the fastest, nevertheless, if installed require about 10 minutes to complete the unloading of one car. To date, no one has built and used commercially such a "push out"/"walking floor" rail car. Moreover, whenever there are moving parts there is liquid leakage, buckling of the door or other closure, latching requirements, and the possibility of malfunction. Another approach is simply to lift and dump an entire railroad car. While this system is obviously fast and effective, it also requires a substantial capital investment. With an installation presently costing close to $1 million for MSW disposal, each landfill would need a railroad line and one of these installations. Further, box cars or open-top cars which have doors or other removable openings which are hinged and/or latched experience problems in that they leak, the doors buckle, and the doors can open unintentionally losing material or presenting a hazard to personnel working with the cars.

Open-top cars also have other problems. The material can be blown out of the car. Rain and contaminants can enter the car directly spoiling the contents if they are not waste products or, if they are waste products, adding to the liquid contained in the car which may present a leaking or odor problem. Sabotage, thefts and spontaneous combustion (a special concern when transporting bulk combustibles such as coal which produces coal dust) are other problems that appear depending on the nature of the material transported. One common solution is simply to cover the open car with a tarpaulin, but tarpaulins are frequently lost or break free in transit. These conditions allow a loss of the material being carried and all of the other problems noted above. Further, tarpaulins require personnel time to install and remove them.

Still another approach, intended principally to control the loss of material due to the wind during transport, has been to bail the MSW or other loose bulk material prior to loading it into the cars. However, it typically requires 8 to 12 hours to load the bails into a car and another 8 to 12 hours to remove them, plus the cost of bailing.

A general problem with all specialized railroad cars is that they are not intermodal, that is, the railroad car cannot move on the highway. Therefore unless the railroad car can be brought directly to a loading facility, the entire system requires that conventional trucks be loaded and haul the material to a loading site at a railroad terminal. This therefore involves the cost of truck hauling as well as the personnel and capital cost for equipment to load and unload the MSW or other bulk material to and from the trailer, and then the railroad car.

Flatbed railway cars carrying trailers ("TOFC" Trailer-on-Flatcar), or what is commonly termed "piggy back" systems, attempt to provide an intermodal transportation system using rail. In this system, typically two trailers are loaded onto a single flatbed car to provide a total carrying weight of approximately 44 tons. While this avoids loading and unloading of the material from the trailer, this arrangement is nevertheless comparatively costly and time consuming. It is necessary to have special TOFC cars, special terminals equipped to load and unload the trailers from the cars, and once the trailers are loaded, they are typically in transit for 10 days, as compared to a typical in transit time to 2 days if the trailer is operated on the highways. Since the capital cost of two trailers is substantial (currently about $90,000), this extra 8 days period of inactivity itself represents a considerable cost increase. More generally, TOFC is a system limited by the load carrying capacity of highway vehicles, which in turn are limited by highway and bridge limitations. It does not take full advantage of the weight and volume capacity of traditional railroad equipment. Therefore TOFC systems have proven useful principally for transporting high value food and manufactured materials, but have not been used for transporting low value bulk materials such as MSW.

Container-on-flatcar ("COFC") systems are also currently in use to provide intermodal transportation. Special containers carry goods on trucks and are then moved onto COFC cars. However, COFC containers heretofore have required special four corner, personnel-activated restraints which space the containers approximately 9 inches above the deck of the flat car. This has a disadvantage in that it produces extreme pressure points on the deck coincident with the points of support of the containers. Also the force of the wind, particularly when the train is moving, acts under the containers and produces a force that tends to lift the containers from the car. Known COFC systems could reach a maximum pay load of 60 tons for railcar, as compared to typically pay load of 44 tons for TOFC carrying two trailers, but COFC systems do not provide the volume, weight and loading/unloading advantages to make them economically advantageous for bulk material transport. Also, currently available systems are not readily adapted to the rapid, convenient and low cost loading and unloading of bulk materials. They are not open-topped and they have doors or other movable closures with latches.

A highly useful intermodal transportation system that is particularly suitable for transporting bulk materials such as municipal solid waste by rail and truck has been disclosed in U.S. Pat. No. 5,078,560, issued on Jan. 7, 1992, incorporated herein by reference in its entirety. The patent discloses, inter alia, use of multiple rectangular, open-top boxes each with a removable lid to transport bulk materials. The system includes a forklift with an articulated frame which engages channels formed in the box or in the lid. In use, an operator of the forklift will typically first engage and remove the lid of the box, e.g. by lifting the lid from the box and storing the lid in or around the worksite. The operator then returns the forklift to the box and engages the channels thereof to lift and manipulate the box. This procedure poses issues of excessive worker and machinery time as engaging the box with the forklift is essentially a two step procedure with a first step of removal and storage of the lid. Moreover, after removal the lid must be stored in area that does not present risk of damage to the lid or interfere with other activities at the worksite. Such an isolated storage area may be remote from the primary worksite or simply not available.

It is thus desirable, now, to provide means to manipulate the box lid of such an intermodal transportation system in a more efficient and convenient manner.

It is therefore a principal object of the invention to provide an improved intermodal transportation system that saves both worker and machinery time.

It is another object of the invention to provide an improved intermodal transportation system that does not require a separate storage area for a lid of a bulk material transport container or box during dumping of material from the box.

SUMMARY OF THE INVENTION

The present invention provides novel apparatus and means for hauling bulk materials such as municipal solid waste (MSW) by means of open-top boxes with removable lids. In the present improved form, apparatus and means are provided so that both the box and box lid are engaged by a forklift simultaneously, and the lid is removed from the box and stored on the forklift itself while the box is manipulated such as dumped by the forklift.

More specifically, bulk material such as MSW is transported in a plurality of rigid, open-top boxes having a bottom wall and four side walls interconnected to one another as by welding, to form a water-tight container with high structural strength. Each box has a lid, preferably formed with an overhanging skirt, which seats over the open top of the box and prevents rain or other liquids from entering the box. Each box and associated lid has at least one, preferably a pair, of hollow fork pockets or channels extending generally horizontally with an access opening positioned at one or more side walls of the box or lid. Preferably each of the lid channels has a smaller volume than each of the box channels. The lid may rest on a sill or preferably engages the top edge of the box to provide a mechanical seal of the box and to control wind lift of the lid from the box during transport.

Each box and associated lid is manipulated and dumped by a forklift that includes a tractor and an articulated frame assembly mounted on the tractor. Mounted at the free end of the frame assembly is at least one fork, preferably a pair of forks for engaging the box, and at least one fork, preferably a pair of forks for engaging the box lid. A hydraulic system is suitably employed to actuate the frame to execute lifting movement which raises and lowers a box and/or lid carried on the forks of the forklift. Preferably the forklift includes actuator means that can move the lid forks to thereby remove the lid from the box, e.g. by an upward rotation of the lid fork within a radius of motion of about 40° to 45°. Alternatively but generally less preferred, the actuator means may drive the one or more box forks only, wherein the lid is removed from the box by raising the box from the ground or a transport vehicle by means of the forklift and then lowering the box forks with respect to the lid forks engaged in the lid to thereby provide separation of the lid and box. To manipulate the raised box, actuator means rake backwardly approximately 15° to shift the center of gravity of a loaded box over the tractor to provide better stability, and produces a "roll-out" action characterized by a rotation through at least 90°, and preferably 150° to dump the contents of the box with at least a 45° downward incline. In coordination with this 150° dumping rotation the frame assembly and hydraulic system also moves the box toward the tractor. In accordance with the present improved system, the lifting and rotation of the box is in coordination with removal of the lid from the box. The forklift preferably also includes a hydraulically actuated lock or locks which engages the gripping member or members on the box to secure the box on the forks during the forward roll-out movement.

These and other features of the invention will be readily understood from the following detailed description of the preferred embodiments which should be read in light of the accompanying drawings.

BRIEF DESCRIPTION OF THE DRAWING

FIGS. 4A–4D are simplified views in side elevation of a forklift and a box and lid according to the present invention where FIG. 4A shows the box forks and lid forks of the forklift engaged in the box and lid, respectively, with the box positioned on the ground and the lid positioned on the box, FIG. 4B shows the lid removed from the box by the lid forks, FIG. 4C shows the box raised with lid removed and held by the lid forks, and FIG. 4D shows the forklift rolled out to a dumping position with the lid held by the lid forks.

DETAILED DESCRIPTION OF THE EMBODIMENTS

Figure 1:
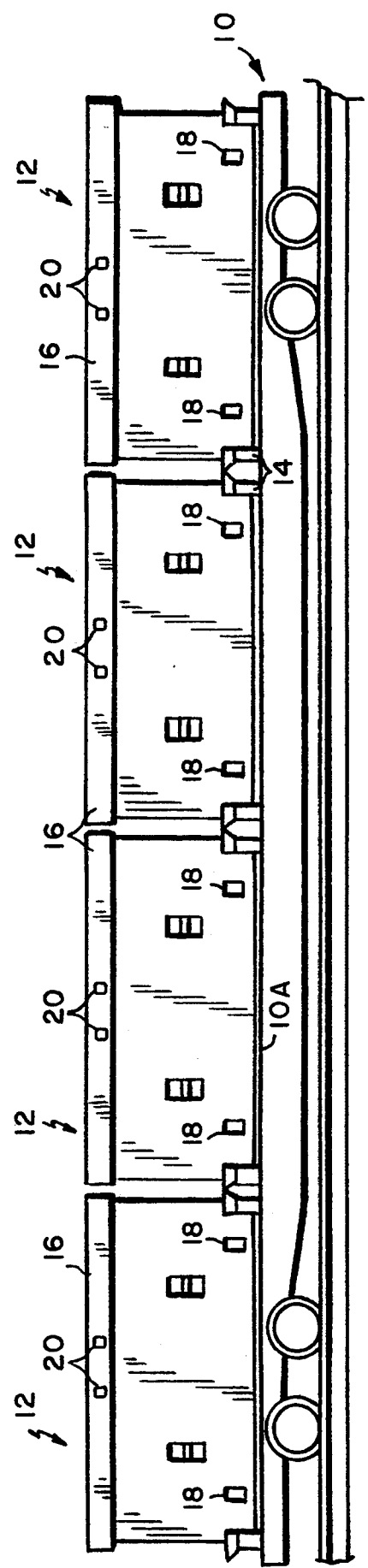
FIG. 1 is a view in side elevation of a reinforced flat-bed railway car carrying boxes with lids according to the present invention.
Figure 2:
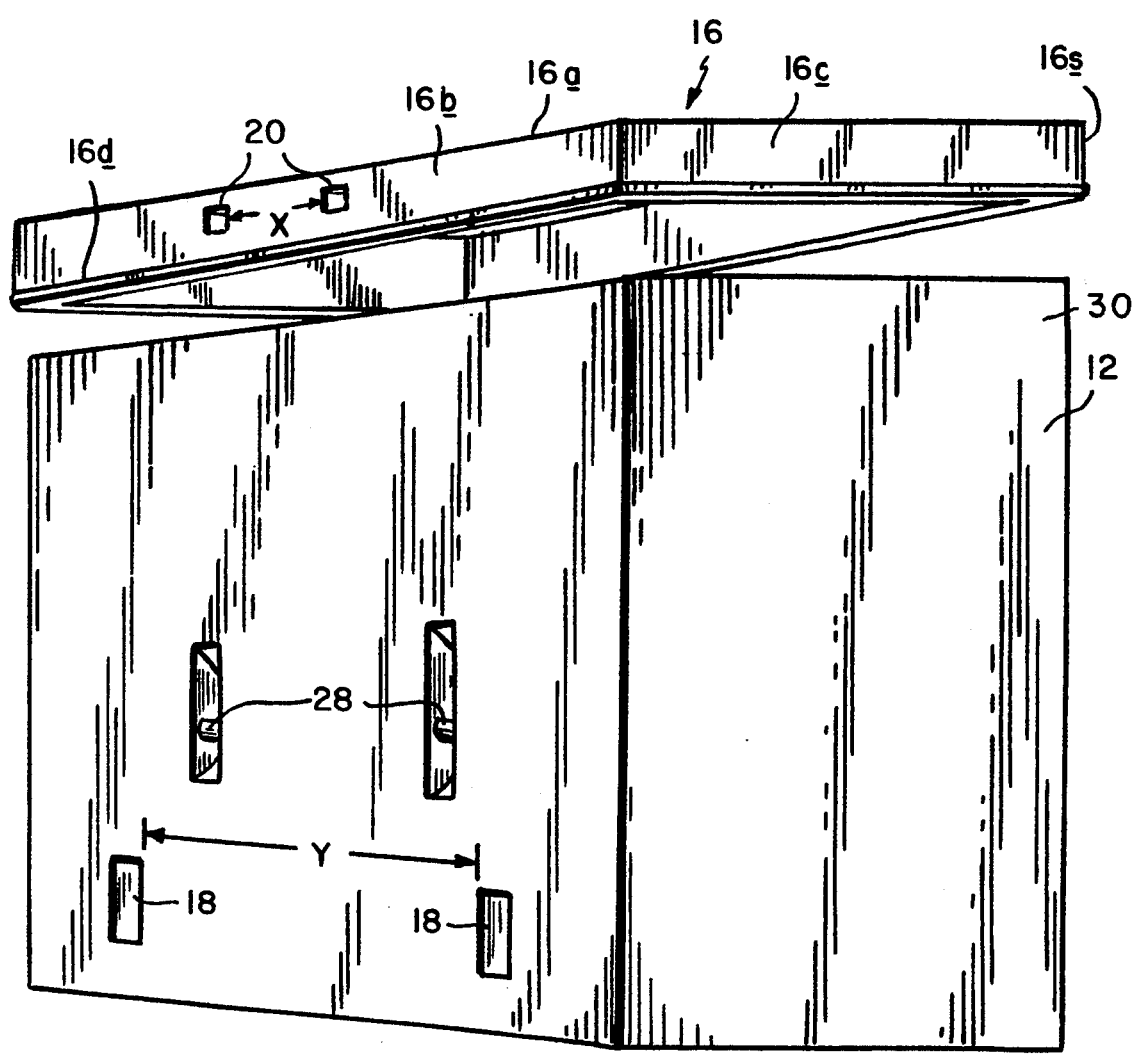
FIG. 2 is a side view of a preferred box and lid according to the present invention.
Figure 3:
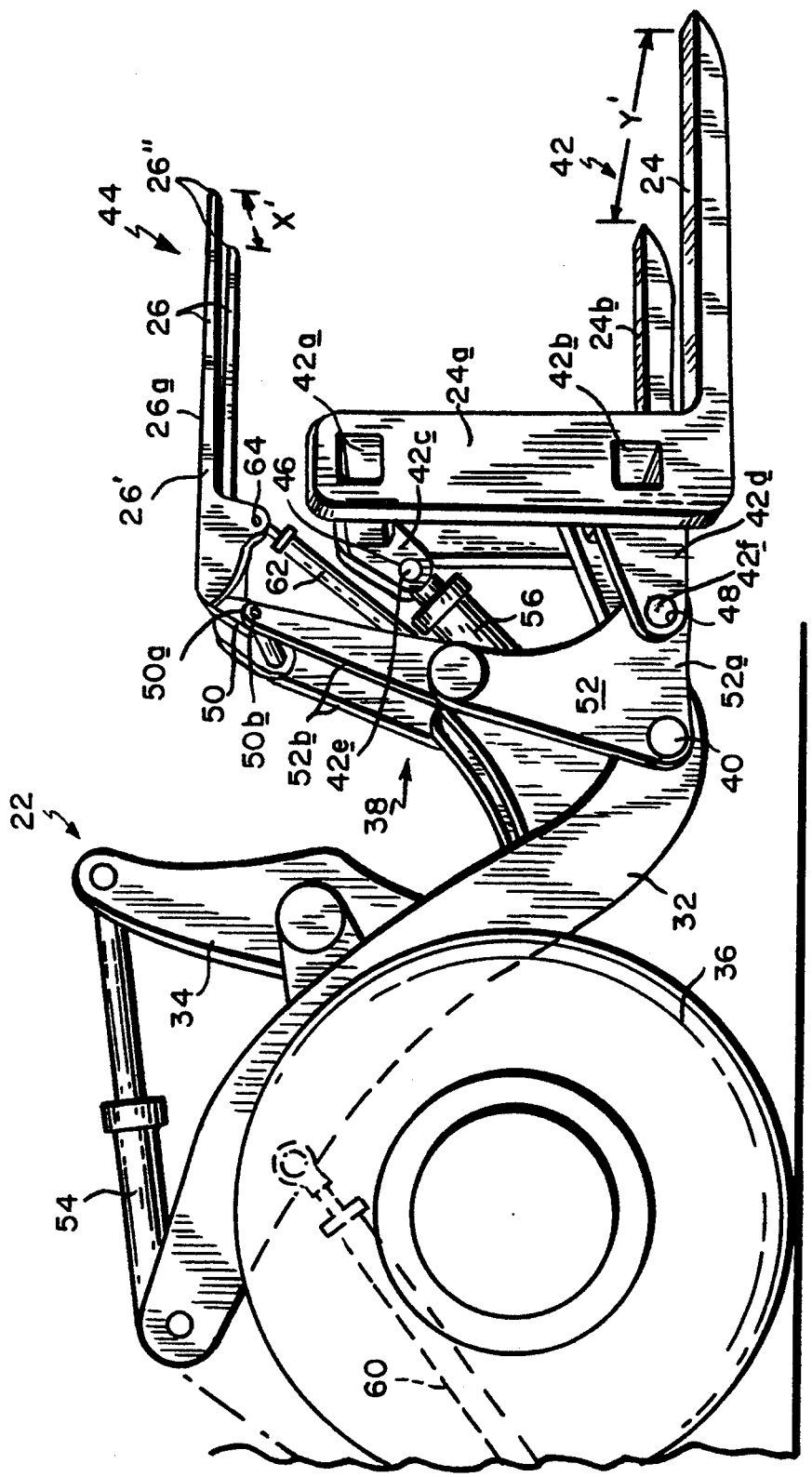
FIG. 3 is a side view of a preferred forklift of the present invention that comprises a set of forks adapted to engage a box and a set of forks adapted to engage a box lid.

FIG. 1 shows a flatbed railway car 10 carrying four open-top boxes 12 located and passively restrained and the deck 10A of the car by four sets of corner guides 14. Each box holds a loose bulk material such as MSW with its open top covered by a lid 16. A skirt portion 16s of the lid overhangs its associated box. The box has a pair of hollow, double open ended channels or pockets 18 that extend across the box and are open at both ends. Each lid 16 also has a pair of hollow, double open-ended channels or pockets 20 that extend across the lid. The two channels 20 of a lid may have about the same lateral spacing therebetween as the lateral spacing between two box channels 18. It is generally more preferred for purposes of this invention, however, that a pair of box channels 18 and a pair of lid channels 20 have different lateral spacing to enable more convenient design of a forklift for the system, i.e. so that one set of forks can be positioned within a second set of forks on the forklift. As shown in FIG. 2 which depicts a preferred box and lid of this invention, it is typically preferred that two lid channels 20 have a smaller lateral spacing X between adjacent sidewalls of the said channels than the lateral spacing Y between adjacent sidewalls of the two box channels 18. Such a design of the lid and box channels enables use of a forklift as depicted in FIGS. 3 and 4A–4D wherein forks that engage the lid channels are positioned within forks that engage the box channels so that the lateral spacing X' (FIG. 3) of forks 26 is less than the lateral spacing Y' of forks 24. In a preferred system, the spacing X' is 45 inches and spacing Y' is 10 feet. Positioning lid channels 20 to correspond to such lateral spacing X' enables use of any standard fork lift for the moving and positioning of the lid.

Figure 4A:
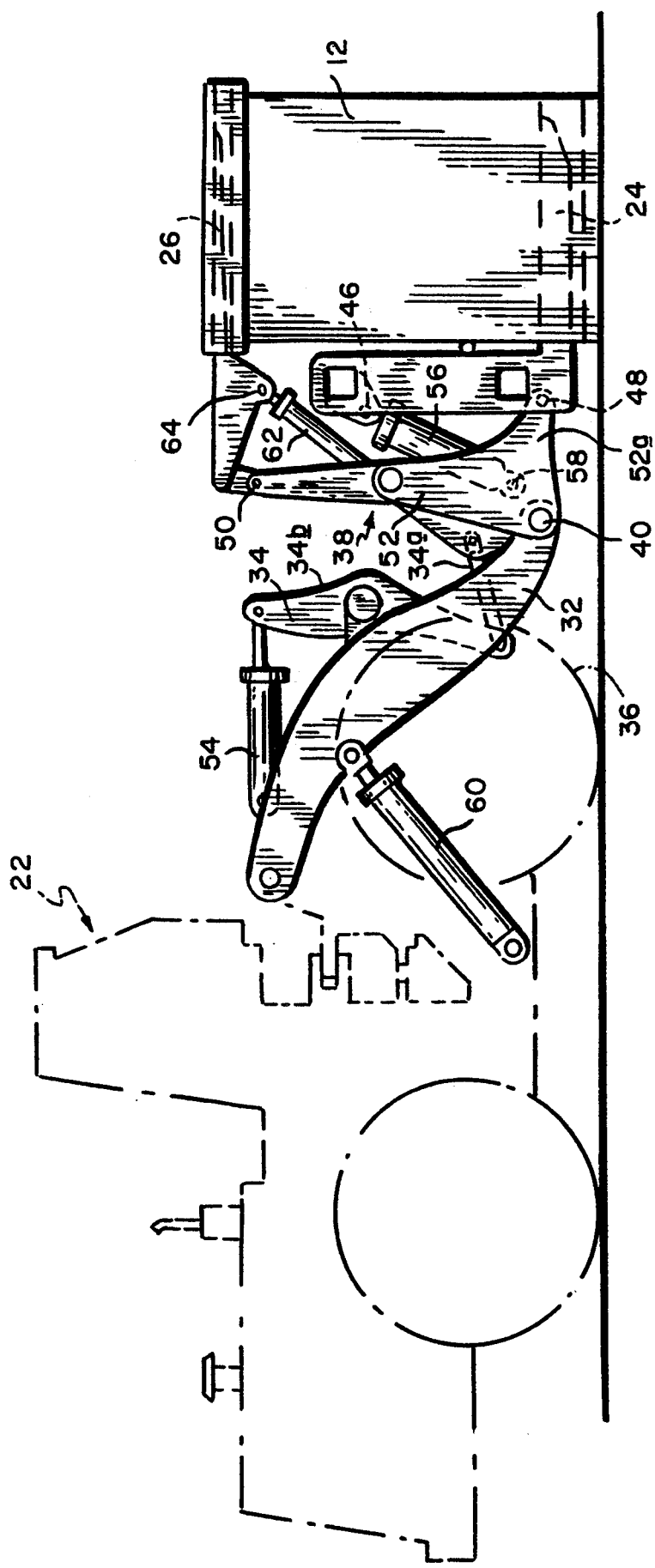

As shown in FIGS. 3 and 4A–4D, a mobile forklift 22 has a pair of forks 24 adapted to enter channels 18 of box 12 and a pair of forks 26 adapted to enter channels 20 of lid 16. The forks 24 and 26 at least substantially simultaneously enter channels 18 and 20, respectively, when box 12 is on the ground as shown in FIG. 4A. After having so engaged the lid and box, lid 16 may be removed from box 12 by lifting lid 16 by means of lid forks 26 and associated actuator means prior to, simultaneously with or after lifting box 12 from the ground or a transport vehicle by means of box forks 24 and associated actuator means. In an alternative embodiment, for example where box forks 24, but not lid forks 26, rotate, the lid 16 is removed from box 12 by raising the box from the ground or transport vehicle by means of the forks 24 and associated actuator means and then the box forks are lowered with respect to the engaged lid forks to provide separation of the lid and box, although this procedure is generally less preferred and may require use of additional means to secure lid 16 on lid forks 26 during dumping or other manipulation of box 12.

Figure 4C:
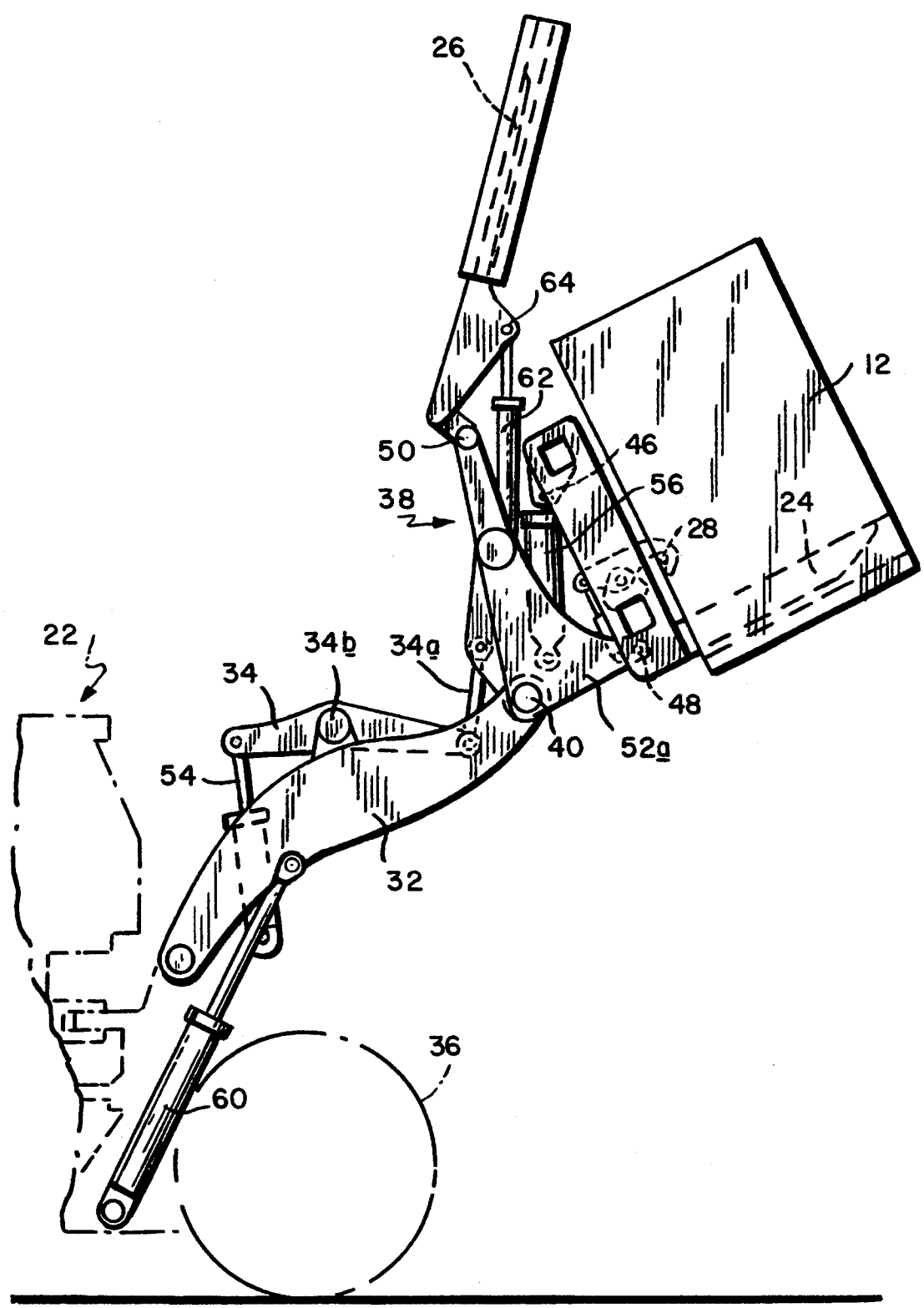
Figure 4D:
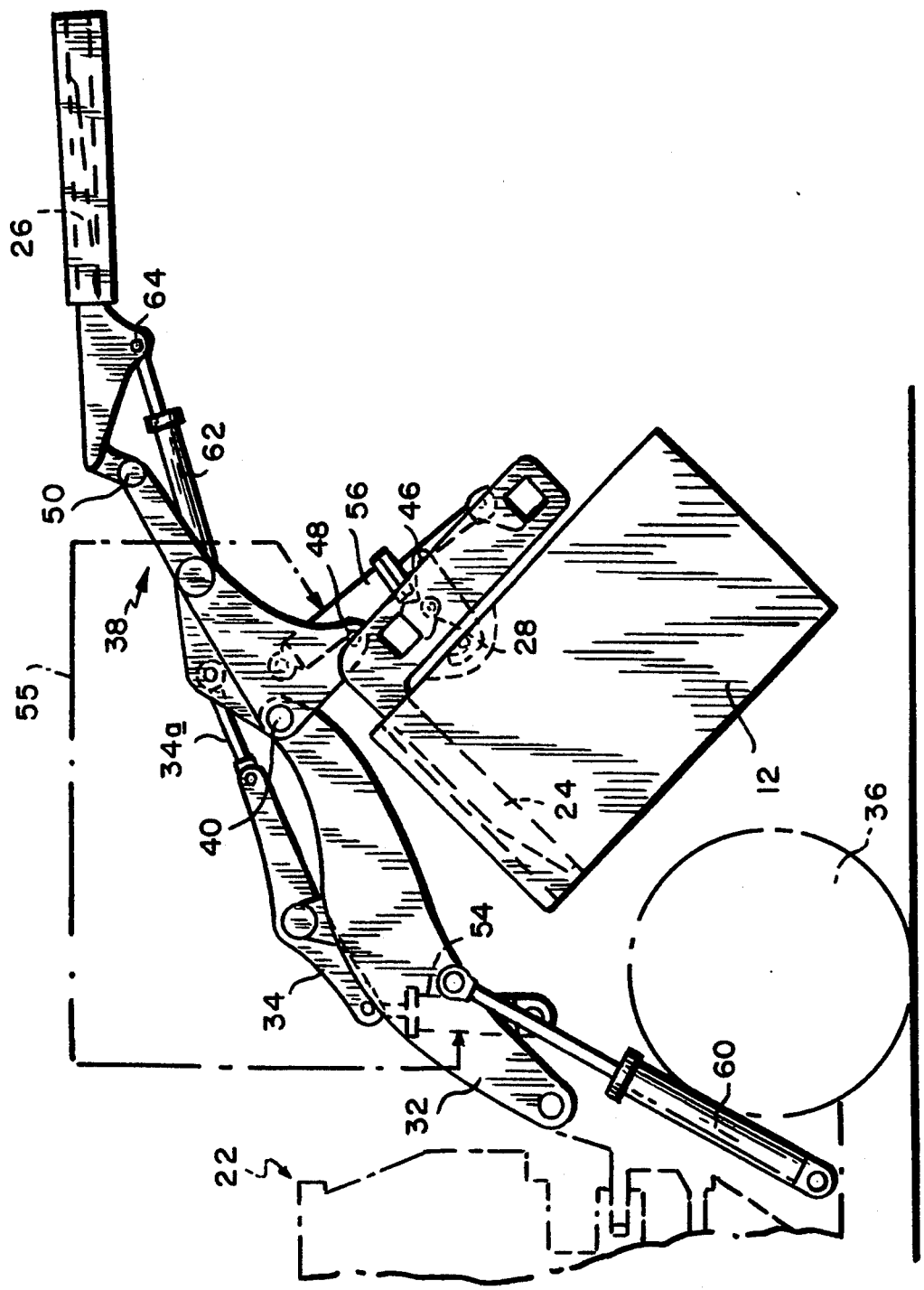

To dump bulk materials contained in box 12 once lid 16 is removed, forklift 22 lifts the box 12 to the position shown in FIG. 4C, raking it back to stabilize the load during travel, and then executes a 150° forward "roll out" motion in a vertical plane parallel to the forklift (from the position shown in FIG. 4C to the position shown in FIG. 4D). This action of the forklift produces an "over-the side" dumping of the MSW or other loose bulk material that is rapid and reliable.

Preferred design and construction of box 12 are described in the above incorporated U.S. Pat. No. 5,078,560, particularly FIGS. 1–10 of that patent. Specifically, each box 12 is essentially an open-topped rectangular container including a floor, side walls and end walls welded or otherwise secured to one another continuously at their adjacent edges for strength and to make the box liquid tight. It is significant that the box has no supports extending across its interior, such as a brace or tie rod extending between the side walls, which can impede the complete and rapid loading or unloading of the MSW, or other bulk materials, from the box. Such braces are also susceptible to bending or breaking from the load or mechanical impacts which can destroy the ability of the box so reinforced to withstand the force of the load during dumping. The box nevertheless has the structural strength, particularly at its side walls, to withstand the forces existing by loads as large as 35 tons, even as it is manipulated by the forklift 22 through a dumping motion which, during a portion of the motion, supports the box by gripping one side wall while the full weight of the load bears on the opposite side wall. The box 12 has no doors, hinges or other openings which must be opened, closed, latched, or unlatched on loading or unloading.

The box floor includes a pair of corner sills and a like pair of parallel, mutually spaced reinforcing sills, all of which extend longitudinally and the full length of the box, preferably an overall length of 21 feet. The corner and reinforcing sills of box 12 are preferably formed as hollow members with a generally square cross section of a suitable structural material such $\frac{1}{4}$ inch thick steel plate. The box floor also includes a floor plate, e.g. a $\frac{1}{4}$ inch thick steel plate with a tensile strength of 50,000 lbs. that is secured to the corner and reinforcing sills as by a continuous weld. The box side walls are each formed of a plate also of ¼ inch thick steel, or a suitable equivalent, that is continuously welded at its lower edge to one of the corner sills and at its ends to an end plate which in turn is continuously welded to them. Steel deflection plates, also of ¼ inch steel, are positioned along the sides of each channels 18 and 20 to guide the forks of the forklift into the channel and to protect the side walls of the box if they are speared by a fork which is not properly aligned with a channel. The box 12 also may be constructed of aluminum rather than steel. While aluminum is a softer metal than steel, it is more resistant to cracks at welds due to the intrusion of moisture into the weld which then freezes and has significant weight advantages over steel. As clearly depicted in FIG. 2, the box 12 includes a gripping member 28 that is preferably a two inch diameter steel rod mounted between a set of laterally projecting mounting bracket and a laterally projecting mounting bracket as described in U.S. Pat. No. 5,078,560.

The lid 16 is similar in construction to the box 12 and is also generally described in aforesaid U.S. Pat. No. 5,078,560. The lid 16 includes a plate top, side walls and end walls all welded continuously to one another, or formed integrally. A pair of double open-sided pockets 20 are formed as rectangular channels adjacent the lid top to allow the forks 26 to enter the channels 20 and manipulate the lid, in particular, to place it on the box after it is loaded with MSW and to remove it from the box at a dump site prior to dumping the box. The lid may be formed of steel or, more preferably, is formed of an aluminum construction for the significant weight advantages this material of construction provides.

As discussed above, a pair of lid channels 20 of a lid 16 preferably have a smaller lateral spacing than a pair of box channels 18 of an associated box 12. Additionally, each lid channel 20 of a lid 16 preferably has a smaller volume, or at least a smaller cross-sectional area, than the volume or cross-sectional area of each channel 18 of an associated box.

The lid skirt portion 16s formed by the side and end walls 16b and 16c overhangs and surrounds the open top of the box as shown in FIGS. 1 and 2. The lid 16 when it closes the box typically rests on the upper ends 30 of the box walls. The overlap between the lid skirt and the box walls is sufficient to ensure that the lid will stay on the box during transit despite wind and/or bouncing or other movements of the rail car. An overlap of at least 18 inches has been found to ensure that a 1200 pound lid of steel construction will remain on the box reliably without the use of positive restraints. Nevertheless, for additional safety chains can be used to secure the lid reliably even if the box is overfilled so that the lid rests on the MSW overfill. The overall height of the box when covered with the lid is about 10 feet.

The box 12 preferably has vertical sidewalls and a volume of approximately 63 cubic yards and can hold loads weighing up to about 35 tons. One railcar 10 carrying four boxes 12 typically can therefore transport more than 265 cubic yards of MSW weighing at least 88 tons. The reinforcing described above allows the boxes to carry this weight, even through the over-the-side dumping. It is also significant that the box and lid have a generally sleek, uncluttered interior and exterior which facilitates loading, unloading and handling of the boxes.

Forklift 22 is a heavy duty, self-propelled wheel loader such as the vehicle sold by Caterpillar, Inc. under the trade designation CAT 992C. The 992C has a conventional bucket attached at the front end of an articulated linkage including a set of lift arms 32, 32 and a Z bar linkage 34. The 992C weighs approximately 96 tons, with a conventional bucket. The center of gravity of the wheel loader, exclusive of the lift arms, associated hydraulic actuators and bucket, is set well behind a pair of front wheels 36. The 992C has a pair of rear wheels, an operator's cab, a diesel engine, and a hydraulic system, all of known construction. The engine is positioned to counterbalance the load.

The forklift 22 of the present invention differs from the CAT 992C wheel loader in the construction and operation of the articulated linkage and the working elements (the box forks 24 and lid forks 26 and their mounting assembly) attached to the end of the lift arms 32, 32, namely, a carriage assembly 38 pivotally mounted at 40 to the front end of the lift arms 32, 32 and a first fork group 42 that includes the forks 24, 24, and a second fork group 44 that includes forks 26, 26. Fork group 42 is pivotally mounted to the carriage assembly 38 at pivots 46 and 48. Fork group 44 is pivotally mounted to the carriage assembly 38 at pivot 50. In the 992C wheel loader, the bucket is mounted in a manner generally similar to that of the carriage assembly 38. A lower pivot is positioned at the end of the lift arms 32, 32 and parallel spaced link arms 34a, 34a of the Z-bar linkage pivotally connected between an upper pivot point on the 992C bucket and one end of parallel spaced tilt links arms 34b, 34b also of the Z-bar linkage. However, the maximum angular travel of the bucket of the CAT 992C is not sufficient to rake back about 15° when the lift arms are raised and then rotate forward to produce at least about a 45° downward dump angle for a box. The backward rake of the forklift and the box carried by the forklift stabilizes the forklift sufficiently to allow safe travel. However, for over-the-side dumping the box should be angled at about 45°, and preferably about 55°, to ensure a rapid and complete unloading. This requires a maximum angular travel of about 150° in the preferred form, which is not possible with the 992C construction.

To provide this large angular travel, the fork group 42 is pivotally mounted at 48 on forwardly extending legs 52a of generally L-shaped frame members 52 (preferably multiple such plates in a parallel spaced relation to provide additional strength and stability for the assembly). The carriage assembly itself pivots about 40 under control of a hydraulic tilt cylinder 54 acting through the Z-bar linkage. In the preferred form the tilt cylinder can produce a rotation of the carriage assembly 38 of about 50°. The rotation is used to rake the box 12 backwards 15° (FIG. 4C) and to then rotate it forward through an essentially horizontal position, where the bottom of the box is essentially or substantially parallel to a ground plane, to a forwardly tilted or "rolled out" position with the carriage assembly in a maximum forward rotational position shown in FIG. 4D.

A further hydraulic cylinder, a rotator cylinder 56, is mounted on the carriage assembly between a pivot 58 and the pivot 46 to produce an additional forward roll out of the box through approximately an additional 100° of travel to the final dump position of FIG. 4D with the box in about a 50° downward inclination and the lid positioned on lid forks 26 along a substantially horizontal plane. It should be noted that in addition to rotating the box 12, the forklift 22 also causes the center of gravity of the box and its load to move laterally toward the forklift. The cylinders 54 and 56 can act simultaneously, but preferably their hydraulic circuits are connected in series (shown schematically as line 55 in FIG. 4D) so that the rotator cylinder, in the dumping cycle of operation, is actuated only after the tilt cylinder has been fully actuated. The line 55 can be conventional 1 inch hydraulic hose lines secured along arms 32, 32 between conventional fittings mounted on the cylinders so that as one cylinder reaches an extreme position and the hydraulic fluid pressure increases, the hydraulic fluid is automatically diverted through the hoses to operate the other cylinder. After dumping, they are operated in reverse order with the rotator cylinder rolling the fork group 42 backwards and then the tilt cylinder returning the carriage assembly (and the fork group and box carried on the fork group) to a generally upright position. It will be understood that the tilt cylinder is also operated in coordination with a main lift cylinder 60 that raises and lowers the lift arms 32, 32, and therefore the box 12. The hydraulic circuit and controls for the lift and tilt cylinders are those conventionally used on the model 992C wheel loader, however, any of a wide variety of conventional hydraulic systems used on wheel loaders and like equipment are suitable.

The fork group 42 has been described in said U.S. Pat. No. 5,078,560 and includes a pair of horizontal support members 42a, 42b that support and bridge vertical legs 24a of the forks 24. The upper support 42a has a mounting bracket 42c that receives a pivot shaft 42e that defines the pivot 46. The lower support 42b has a similar mounting bracket 42d that receives a pivot shaft 42f that defines the pivot 48. The fork group 42 also includes a pair of lock assemblies that prevent an engaged box from sliding off the forks when the fork assembly is "rolled-out" to a dump position. Such lock assemblies have been described in U.S. Pat. No. 5,078,560.

Fork group 44 is of similar design as fork group 42 but is suitably comprised of horizontal legs 26a that are of smaller cross-sectional dimensions and shorter length relative to horizontal legs 24b of fork group 44 due to the comparatively lighter loads that forks 26 manipulate. For example, in a preferred system each fork 24 is about 9 feet in length and has a height of about 12 inches, and a width of about 12 inches; and each fork 26 is about 5 feet in length and proximate to carriage 38 (position 26' in FIG. 3) has a height of about 1 inch and a width of about 4 inches and tapers at endpoint 26'' (FIG. 3) to a height of about 0.5 inches and a width of about 4 inches.

Fork group 44 is pivotally mounted at pivot 50 on upstanding portion 52b of generally L-shaped frame members 52. It will be appreciated that upstanding portion 52b extends upward beyond the top of vertical legs 24a so that forks 26 are positioned to engage lid channels of a lid 20 simultaneously while forks 24 engage box channels 18 of an associated box 12. A mounting bracket 50a is secured on upstanding portion 52b that receives a pivot shaft 50b that defines pivot 50. Fork group 44 rotates upward, typically within a range of motion of about 40° to 45°, by actuator means of hydraulic cylinder 62 attached to fork group 44 at 64. With fork group 46 engaged in lid channels 20 of a lid and rotation of the fork group 44 upward to a near vertical position such as depicted in FIG. 4C, the lid 20 will remain seated on the fork group without the use of separate attachment means through a full rotation of box 18 to an extended dumping position as shown in FIG. 4D.

The flatbed railcar 10 is a Pullman-Standard F89-E which has additional reinforcing members, particularly bolster web strengthening, wide diameter (6.5 inches) axles and larger than usual (36 inch) wheels, all adapted to carry four boxes 12 fully loaded, a maximum weight of about 100 tons with an overall length of 89 feet and a gross weight of 286,000 lbs. Suitable such reinforced railway cars are manufactured by among others Railway and Industrial Services, Inc. of Joliet, Ill. As described in U.S. Pat. No. 5,078,560, significant benefit is provided by the passive restraint system of the corner guides 14 secured to the solid steel railcar deck 10A. The corners are each preferably L shaped in horizontal section and extend vertically for a sufficient distance that there is substantially no likelihood that the box will bounce upwardly out of the corner. Preferably each corner is formed of ¼ inch steel plate or the equivalent and extends vertically for eighteen inches measured from the upper surface of the deck 10A. The corner-to-box spacing is close, a typical separation being about 1 inch to avoid shifting of the load on the railcar and resist a tipping of the boxes as the railcar corners or sways. The upper ends of each corner are flared outwardly, preferably at the rake back angle of the forklift, so that the box 12 carried by the forklift in the position shown in FIG. 4C readily seats in the corners and is guided by them into a seated carrying position where the bottom face of the box is flush with the deck 10a and the corners 14 surround the adjacent corners of the box. In this relationship, the box is restrained from a lateral movement with respect to the railway car, but no latches, catches, ties or other active restraints are required.

The corners are secured to the deck preferably by welding in a manner which does not interfere with the flush abutment of the box with the deck to resist wind lift problems, and to evenly distribute the weight of the boxes over the deck 10a. This passive restraint allows a simple "drop-in" loading of the boxes that is compatible with the manipulation of the boxes by the forklift 22, yet secures the boxes on the railcar against all but a severe crash or derailment. The passive restraint system of the present invention has successfully withstood a crash test of the railcar 10 carrying two fully loaded and two empty boxes and with the railcar traveling at 11 miles per hour, in satisfaction of safety standards of the Association of American Railroads. In addition, over 5,000 such railcars have moved, fully loaded, over the past 3 years.

Figure 5:
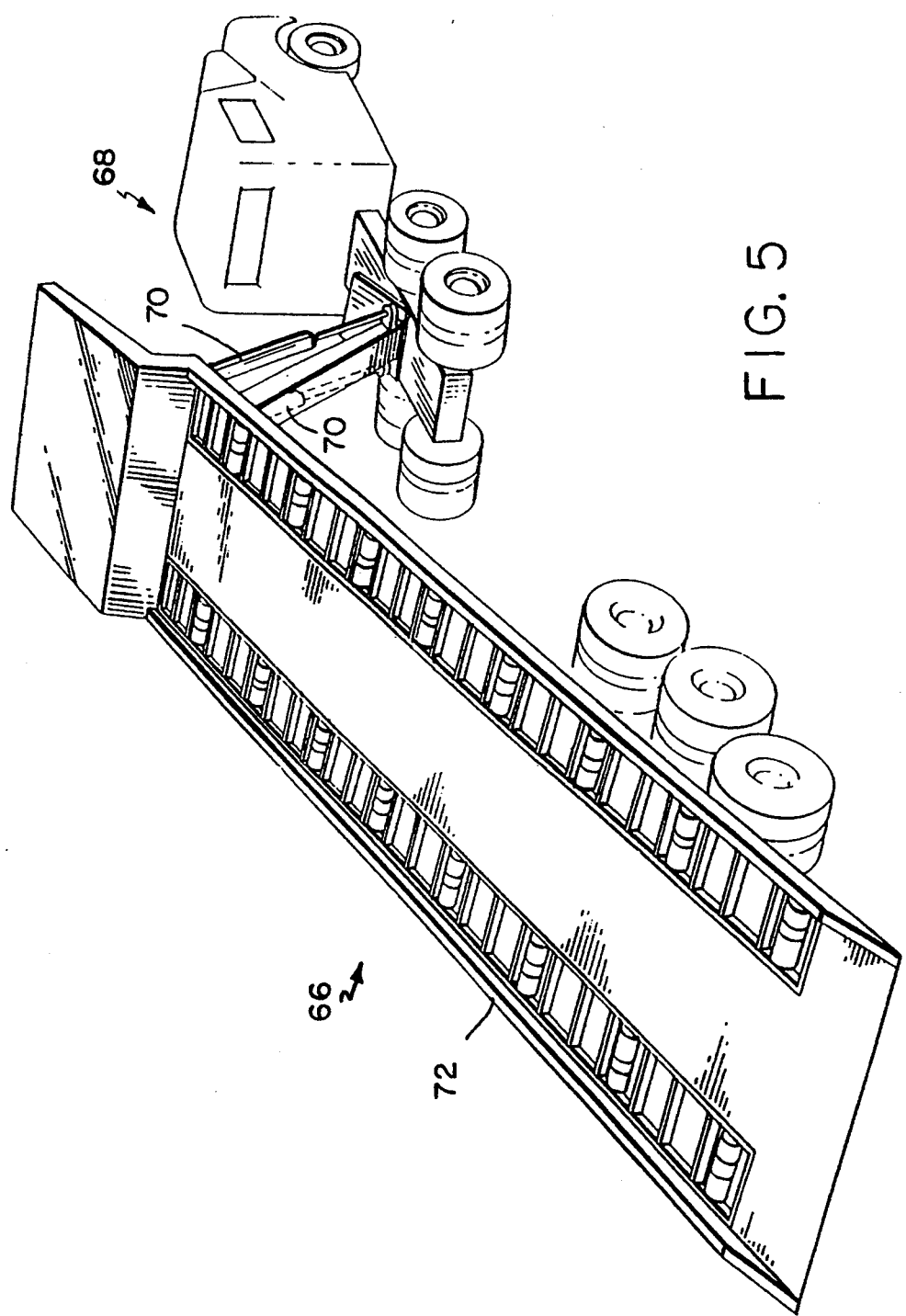
FIG. 5 is a view in perspective of a roller-bed trailer suitable for conveying boxes of the present invention.

FIG. 5 illustrates a particular design of the truck 66 particularly adapted to hauling the boxes 12. The truck 66 and use thereof is described in U.S. Pat. No. 5,078,560 and is a modified tilt bed truck sold under the commercial designation Hauloll by Landoll of Marysville, Kans. A tractor 68 has a pair of hydraulic cylinders 70, 70 that raise the front end of a flatbed trailer 72. The trailer has multiple axles, typically three axles near its rear end, disposed so that the weight of the trailer and its load is carried on all three axles when the trailer is loaded, but on only the rearmost one or two axles when it is raised. In the raised position shown in FIG. 5, the rear edge of the trailer is adjacent the ground and the entire bed is a ramp with an inclination of about 22°. A winch (not shown) includes a steel wire cable that can reach the length of the trailer bed to hook onto a box and draw it onto the trailer.

In operation, a box is placed at a MSW collection site where the MSW is loaded into the box by any convenient means such as a conventional wheel loader with a bucket which is also used to tamp down the material in the box to provide a more efficient packing. When the box is full, a forklift 22 engages the lid channels 20, if the lid is not already seated on the lid forks 26, and the lid is placed on the loaded box. Forklift 22 typically moves the loaded box and lid to a location where it can be loaded onto a truck for highway transport to a railcar 10 or directly onto the railcar 10 if the collection site is at a rail siding. The box is lowered onto a railcar deck 10A by forklift 22 within four of the corners 14. See U.S. Pat. No. 5,078,506. The safety chains for the box are hooked to secure the lid during transit.

Upon arrival at the unloading terminal, another forklift 22 removes the box from the rail car and places it on a truck for transport to the dumping area. At the dumping area, the chains that were used to restrain the lid during transit are now removed. The forklift 22 with the lid and box both engaged elevates the lid from the box and commences the dumping action. The box is dumped in a 150° rotation in parallel with the longitudinal vertical plane of the forklift 22. The final dump position is shown in FIG. 4D. These simultaneous, coordinated actions can be performed by a single operator using only two control levers and results in a fast and complete unloading of the contents of the box. As the box is returned to a vertical position after dumping, and while the box is still moving, the lid can be placed on the box. Thus, the lid is seated on the box upon return of the box to the transport truck-trailer or railcar. Replacing the lid restraint chains is the sole remaining operation before returning the box to the original loading site.

In its method aspects, the present invention includes means for transporting and dumping bulk material from a box and having a lid seated thereon by 1) engaging forks of a forklift into channels of the box and lid so that the box and lid are simultaneously each engaged by one or more forks of the forklift, 2) providing relative movement of the lid fork with respect to the box fork, particularly by lifting the lid forks upward to thereby raise the lid to a near vertical position, 3) either before, simultaneously with or after said mutual movement of the lid and box forks, raising the box to an elevated position, and then 4) rotating the box forks forwardly and in coordination with a backwards movement of the box toward the forklift to dump bulk material contained in the box. The dumping motion includes a 150° forward roll-out of a loaded box from a raked back position.

There has been described a bulk material transportation system that is simple, rugged, reliable, easy to use, has a competitive cost (both capital and operating), and which allows MSW and other loose bulk materials, particularity materials of low intrinsic value, to be shipped economically by rail while also being intermodal, that is, adaptable to transport over highways by truck. The system of the present invention includes a rapid and convenient unloading of the bulk material from the container, as well as of the loaded container onto and off of a flatbed railcar. This system also hauls the material while protecting it from moisture and other environmental factors and protecting the environment against moisture leakage from the boxes or escape of material from the boxes during transit.

While the invention has been described with respect to its preferred embodiment, it will be understood that various modifications and various will occur to those skilled in the art from the foregoing description and the accompanying drawings. For example, while the lid has been described as one with pockets and an overhanging skirt, it is within the scope of this invention to manipulate the lid using openings formed in raised brackets extending from the lid and to seat the lid within the box, although this arrangement will be more susceptible to the entry of moisture into the box, even if drain holes are provided in the box walls. Still further, regular flatcars can be used, with a significant attendant loss in carrying capacity, and the boxes can, of course, be made in different dimensions, with trade offs of carrying capacity against the ability to withstand the weight and be manipulated by the forklift 22. These and other variations and modifications are intended to fall within the scope of the appended claims.

What is claimed is:

1. A lid manipulator for a bulk materials transportation system comprising a box that holds bulk material, said box having a bottom and four side walls formed of a high strength, rigid structural materials and interconnected with one another to form an open top container, at least one horizontal open-ended box channel formed in said box adjacent said bottom wall and extending between said side walls, a replaceable lid adapted to seat on and enclose the open top of said box, said lid being formed of a rigid structural material, a tractor for carrying and dumping said box and including (i) at least one box fork adapted to engage said box channel, (ii) an articulated frame mounted on one end of said tractor that mounts said box fork to articulate about a first axis of rotation, and (iii) actuator means to drive said articulated frame to lift said box fork and rotate the box fork, in coordination with a downward and rearward dumping movement of said box fork toward said tractor, to dump the bulk material from the box while stabilizing the combined weight of the tractor and said box carried on said box fork, and (iv) means for releasably securing said box on said box fork during said rotating, at least one open-ended lid channel formed in the lid and extending generally parallel to said open-ended channel in said box, at least one fork mounted on the frame and adapted to engage said lid channel while said box fork and box channel are engaged, said at least one lid fork operable in coordination with said dumping movement of said articulated frame and box fork to remove the lid from the box and hold it in a spaced relationship over said box during said dumping.

2. The lid manipulator according to claim 1 further comprising actuator means to drive said articulated frame to move said lid fork to remove the lid from the box.

3. The lid manipulator according to claim 2 wherein said moving of the lid fork involves a rotation of the lid fork about a second axis in a parallel spaced relationship with said first axis and within a range of motion of about 45°.

4. The lid manipulator according to claim 1 wherein each said lid channel has a smaller volume than each said box channel.

5. The lid manipulator according to claim 1 wherein each lid has two lid channels and each box has two box channels, and the lateral distance separating the two lid channels is less than the lateral distance separating the two box channels.

6. Means for transporting and dumping bulk material from a box having a removable lid, the box having at least one horizontal open-end box channel adapted to receive a lifting fork and a lid releasably mounted on the box, comprising a tractor having an articulated frame assembly mounted thereon and a fork mounting frame carried on the front end of said articulated frame opposite said tractor, at least one box fork mounted on said fork mounting frame and adapted to engage said box in said horizontal channel, means for actuating said articulated frame assembly to move said box through a roll-out dumping motion, said roll-out dumping motion characterized by a forward rotation of said box through at least 90° combined with a backward movement of said box toward said tractor to maintain a stable center of gravity of said transporting and unloading means during said dumping, at least one horizontally extending lid channel formed in said lid that is generally parallel to said at least one open-ended box channel when the lid is on the box, at least one lid fork mounted on said fork mounting frame and adapted to engage said lid in said lid channel while said box fork and box channel are engaged, and means for removing said lid from said box and holding it in a spaced relationship over said box during said roll-out dumping using said lid fork and the engagement of said lid fork and lid channel to produce said holding.

7. The means of claim 6 further comprising actuator means for said articulated frame to move said lid fork to remove the lid from the box.

8. The means of claim 7 wherein said moving of the lid fork involves a rotation of the lid fork within a range of motion of about 45°.

9. The means of claim 6 wherein each said lid channel has a smaller volume than each said box channel.

10. The means of claim 6 wherein each lid has two lid channels and each box has two box channels, and the lateral distance separating the two lid channels is less than the lateral distance separating the two box channels.

11. A method for manipulating a lid of a box containing bulk material and having at least one horizontal channel adapted to receive a lifting fork, that includes providing (1) a box having, (i) a bottom wall and four side walls interconnected with one another to hold said bulk material, (ii) at least one open-ended channel formed in said box adjacent to said bottom wall that extends horizontally between said side walls, and (2) a tractor having at least one box fork adapted to engage said box channel, comprising (a) providing at least one open-ended channel in said lid, and at least one lid fork on the tractor that is adapted to engage said lid channel while said box fork and horizontal box channel are engaged;

(b) engaging said lid fork in said lid channel and said box fork in said box channel so that the lid fork is engaged in the lid channel and the box fork is engaged in the box channel simultaneously;

(c) relatively moving said lid fork and box fork with respect to each another to remove the lid from the box; and (d) with the box raised to an elevated position by means of said box fork, rotating said box fork forwardly and in coordination with a backwards movement of the box toward the tractor to dump bulk material from the box while said lid fork remains engaged in said lid.

12. The method of claim 11 wherein said lid fork is moved upwardly to remove the lid from the box.

13. The method of claim 11 wherein prior to said step (c) said box fork is lifted to raise the box to an elevated position.

14. The method of claim 13 wherein after the box is raised to an elevated position, said lid fork is moved upwardly to remove the lid from the box.

15. The method of claim 13 wherein after the box is raised to an elevated position, said box fork is lowered to remove the lid from the box.

16. The method of claim 11 wherein after said step (c) said box fork is lifted to raise the box to an elevated position.

* * * * *